United States Patent
Gupta et al.

(10) Patent No.: US 9,357,567 B2
(45) Date of Patent: May 31, 2016

(54) SYSTEM AND METHOD FOR SHARING DATA OVER WIRELESS ADHOC NETWORK

(75) Inventors: Puneet Gupta, Karnataka (IN); Chitrajit Chandrashekar, Karnataka (IN)

(73) Assignee: Infosys Limited (IN)

( * ) Notice: Subject to any disclaimer, the term of this patent is extended or adjusted under 35 U.S.C. 154(b) by 428 days.

(21) Appl. No.: 13/179,630

(22) Filed: Jul. 11, 2011

(65) Prior Publication Data

US 2012/0250615 A1    Oct. 4, 2012

(30) Foreign Application Priority Data

Mar. 31, 2011  (IN) .......................... 1064/CHE/2011

(51) Int. Cl.
*H04W 88/04*     (2009.01)
*H04W 84/18*     (2009.01)
*H04W 76/00*     (2009.01)

(52) U.S. Cl.
CPC ............ *H04W 76/002* (2013.01); *H04W 88/04* (2013.01); *H04W 84/18* (2013.01)

(58) Field of Classification Search
USPC .................................. 370/328, 327; 455/41.2
See application file for complete search history.

(56) References Cited

U.S. PATENT DOCUMENTS

| | | | |
|---|---|---|---|
| 2006/0104200 A1* | 5/2006 | Park | 370/216 |
| 2007/0030824 A1* | 2/2007 | Ribaudo et al. | 370/328 |
| 2007/0136473 A1* | 6/2007 | Birchler et al. | 709/226 |
| 2007/0204321 A1* | 8/2007 | Shen et al. | 725/135 |
| 2009/0047903 A1* | 2/2009 | Eisenbach | 455/41.2 |
| 2010/0115613 A1* | 5/2010 | Ramaswami et al. | 726/22 |
| 2010/0185753 A1* | 7/2010 | Liu et al. | 709/219 |
| 2011/0117897 A1* | 5/2011 | Lee et al. | 455/414.3 |

* cited by examiner

*Primary Examiner* — Michael Thier
*Assistant Examiner* — Yaotang Wang
(74) *Attorney, Agent, or Firm* — Lerner, David, Littenberg, Krumholz & Mentlik, LLP

(57) ABSTRACT

The method for sharing data over wireless adhoc network using mobile devices comprises a step of determining a user required data on a handheld device. The method further comprises broadcasting the user required data within the wireless adhoc network. Further, the method includes detecting a plurality of devices comprising the user required data. The method also comprises establishing a communication channel, in a proximity environment between the plurality of devices and the handheld device. The method further comprises sharing of the user required data automatically between the plurality of devices and the handheld device.

20 Claims, 3 Drawing Sheets

SYSTEM AND METHOD FOR SHARING DATA OVER WIRELESS ADHOC NETWORK

TECHNICAL FIELD

The present disclosure relates to a communication network system between mobile devices, more particularly to a system and method for sharing data over wireless adhoc network using mobile devices.

BACKGROUND

Over the past decade, the wireless communication network system typically uses Internet Protocol (IP) to transport packet data representative of voice, video, data or control traffic between endpoints (or "hosts" in IP terminology). In such systems, the data is divided into IP packets called datagrams that include addressing information (e.g., source and destination addresses) that enables various routers forming an IP network to route the packets to the specified destination. The destination address may comprise an address identifying a particular host or an address shared by a group of hosts. Typically, the hosts include various fixed devices and mobile wireless devices, often called mobile terminals that are capable of roaming from site to site or even between different wireless access point (AP) that use IP.

In the field of wireless communication, a hotspot is defined as a readily available wireless network area, covered by the access point. The user with variety of wireless devices in the AP may make use of the internet, download files, in wireless mode. This will only be possible when the user is able to connect to the nearby access point.

Due to the enhanced utility of this wireless communication and mobile internet and intranet access, it is envisioned that multiple mobile devices, which uses IP will be carried within a car, airplane, and train (or even on a person). Such a collection of devices is known as a wireless network and the IP-addressable devices residing within the wireless network are known as wireless network nodes. It would be desirable to provide the communication network for various devices at various locations around one or more access points.

Ad-hoc communication network is a short-range wireless network comprising an arbitrary collection of wireless devices that are physically close enough to exchange information. The ad-hoc network is constructed quickly with mobile wireless devices as they enter and leave the proximity of the remaining mobile wireless devices. The ad-hoc network also may include one or more access points, that is, stationary wireless devices operating as a stand-alone server or as gateway connections to other communication networks.

Although wireless communication is opening the door to a completely new dimension of computing and business practices that propel enterprises to new heights of service and flexibility, however, a number of problems are associated with the wireless communication. The access points and therefore, the hotspot, increase in numbers and thus becomes complex to manage and monitor. The various components that make up a wireless infrastructure, such as servers, companion desktops, etc., require effective monitoring and management, in order to maintain an optimal work environment and increase productivity. Furthermore, as different hotspots at any time provide different quality of service because of the local conditions, it becomes difficult for the user to rely completely on the hotspots to obtain the required data.

Accordingly, there is a need for a technique that enables effective data gathering or sharing through mobile devices in an adhoc wireless system without use of hotspots, thereby improving the user experience while browsing for the required data on a handheld device.

SUMMARY OF THE INVENTION

Aspects of the disclosure relate a communication network system between mobile devices, more particularly to a method for sharing data over wireless adhoc network. A method for sharing data over wireless adhoc network comprises determining a user required data on a handheld device. The method further comprises broadcasting the user required data within the wireless adhoc network. Furthermore, the method comprises detecting a plurality of devices comprising the user required data. The method also comprises establishing a communication channel between the plurality of devices and the handheld device within a proximity environment. Sharing of the user required data automatically between the plurality of devices and the handheld device can also be a step of the method.

According to the one aspect of the present disclosure, a system for sharing data over wireless adhoc network comprises a data determining module configured to determine a user required data on a handheld device, wherein the handheld device is a mobile phone. The system further comprises a data broadcasting module configured to broadcast the user required data within the wireless adhoc network. The system also can comprise a device detecting module configured to receive user required data from the data determining module and to detect a plurality of devices comprising the user required data within a proximity environment. Furthermore, the system also comprises a data sharing module configured to assist in sharing of the user required data automatically between the plurality of devices and the handheld device.

DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

The following discussion relates generally to a method for sharing of user required data between a plurality of devices in a wireless adhoc network.

The various embodiments discussed herein are generally adapted for improving the user experience while browsing data on a hand held device efficiency of the communication network. As will be appreciated by persons skilled in the art, communication network refers to a group of two or more devices linked together in a network. In the present context, a device refers to handheld devices and more particularly to a mobile device, which are adapted to establish connection in the communication network. It should also be noted that devices are also referred as peers in the communication network terminology. There are many types of communication networks, which includes local-area networks (LANs), wherein the devices are geographically close together.

Figure 1:
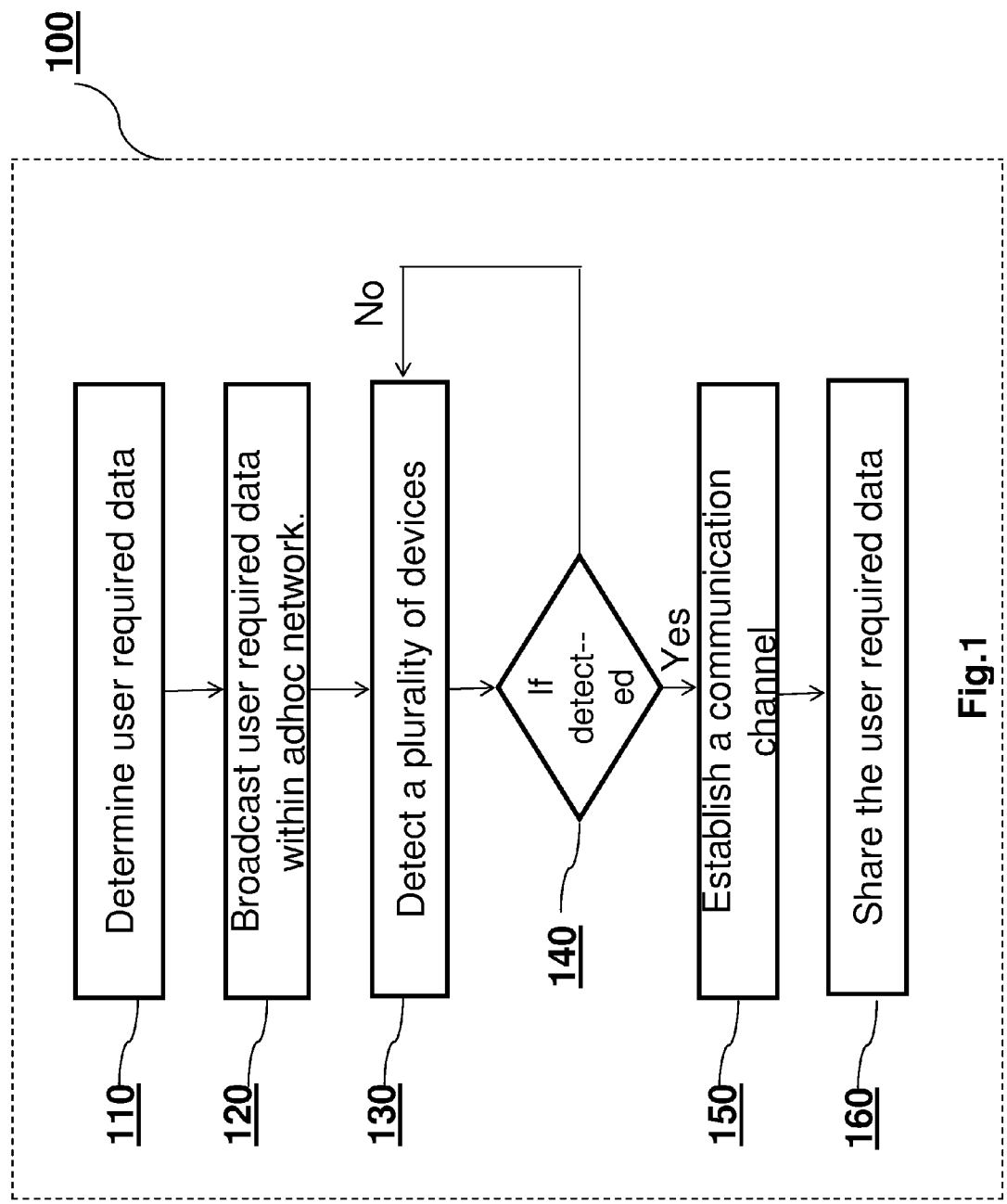
FIG. 1 is a flow chart illustrating a method 100 for sharing of user required data in a wireless adhoc network, in accordance with an embodiment of the present disclosure.

FIG. 1 depicts a flowchart illustrating a method 100 of establishing a communication channel between the plurality of devices for exchanging information points, in accordance with one embodiment of the present technique. As illustrated, the method 100, beings by step 110 which describes determining the user data required on a handheld device. The user required data is determined based on a plurality of information present on a handheld device. The user required data can be, but not limited to information related to the network infrastructure, that is information may be pertaining to the access points which may contain better quality of service. The user required data can also be a webpage content which cannot be retrieved due to various constraints such as, poor quality of service from the access points, disability to connect to an access point. The user required data can also be information related to geographical location and information related to a plurality of services such as, information regarding ATM, Petrol bunks, service stations etc. The plurality of data present on the handheld device can be historical data present on the web-browser of the handheld device.

At step 120, the user required data is broadcasted within the wireless adhoc network. Broadcasting of the user required data includes, using communication channels such as bluetooth, infrared, web-enabled services to broadcast the data within the wireless adhoc network.

At step 130, the plurality of devices comprising the user required data are detected. The handheld device automatically starts detecting for the plurality of devices through a communication channel which may include, bluetooth, infrared, or any similar wireless communication. The handheld device determines the user required data on the plurality of devices by accessing the browser history contents, or the location at which the cached data is stored in the plurality of devices. In another embodiment of the present disclosure, the handheld device can also communicate with an access point to directly obtain the data, if the user is happy with the quality of service provided by the access point. Furthermore, at step 140, the handheld device continuously keeps detecting for the plurality of devices until the user required data is found on at least one or more of the plurality of devices.

At step 150, after the handheld device detects the plurality of devices which contains the user required data, a communication channel is established between the plurality of devices and the handheld device within a proximity environment. The communication channel can be, but not limited to a bluetooth connection, an infrared connection, a connection to the plurality of devices through an access point etc. The proximity environment is preferably an adhoc wireless network. The handheld device automatically, that is without any user intervention, establishes a connection with the plurality of devices comprising the user required data.

At step 160, the user required data is shared automatically between the plurality of devices and the handheld device. Once the handheld device identifies the plurality of devices, which can be one or more, a transparent communication is automatically established between the handheld device and the plurality of devices. In another embodiment of the present disclosure, the transparent connection can be established between the handheld device and a plurality of devices without any user intervention. After a transparent communication channel has been established, the user required data is automatically shared between handheld device and the plurality of devices. Furthermore, as soon as the user required data has been received on the handheld device, a completeness check is carried out to identify if the complete data has been shared. If the complete user required data has been shared, then it is displayed on to the output screen of the output device for the user to view or to read. If the data gathered is not complete, the handheld device again detects for the plurality of devices consisting of the user required data. The steps are repeated until the user required data is gathered completely on to the hand held device. After the user required data has been gathered on to the hand held device, the user required data is logically arranged to display it in a readable format to the user.

Figure 2:
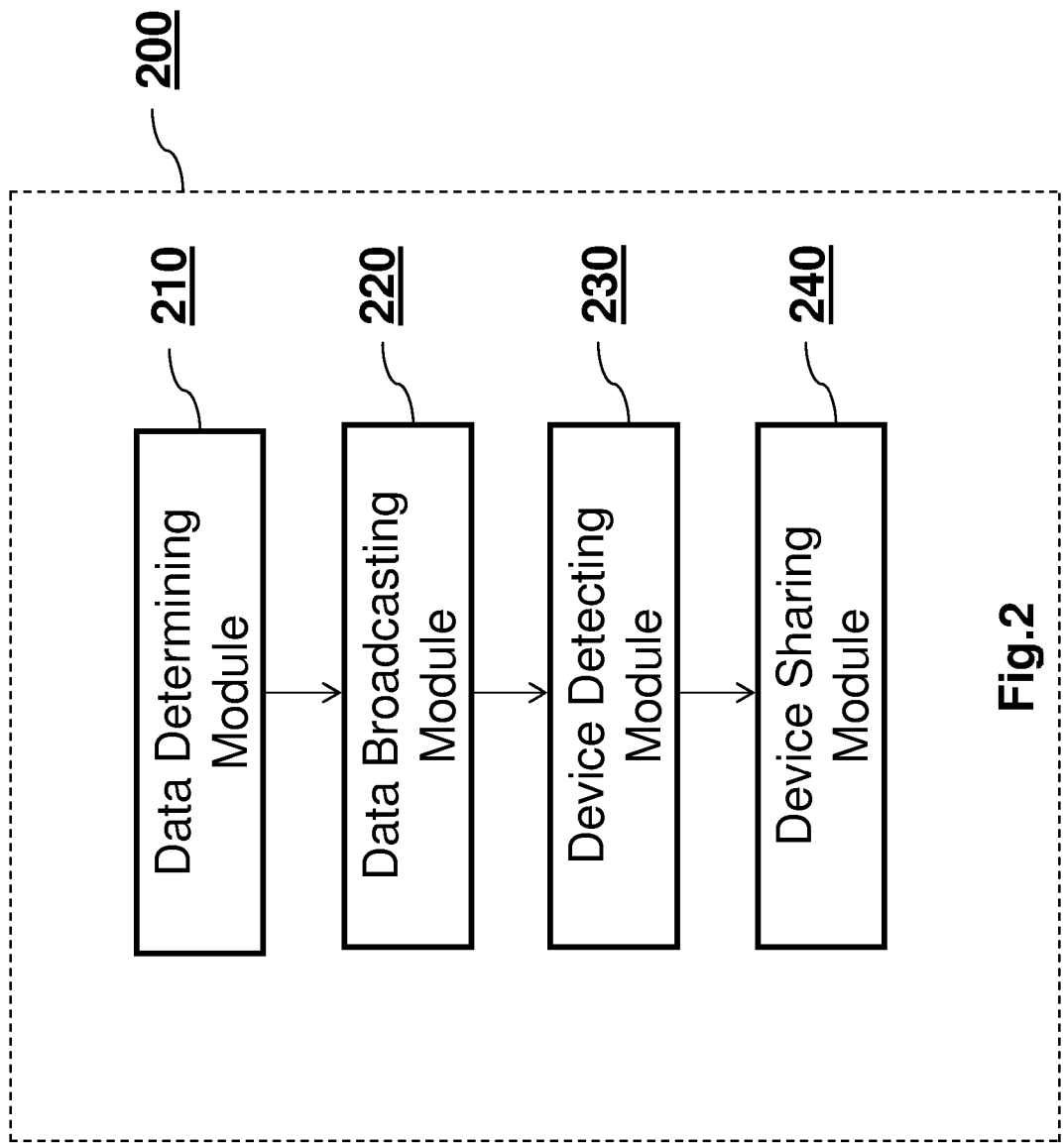
FIG. 2 is a block diagram illustrating a system 200 for sharing of user required data in a wireless adhoc network, in accordance with an embodiment of the present disclosure.
Figure 3:
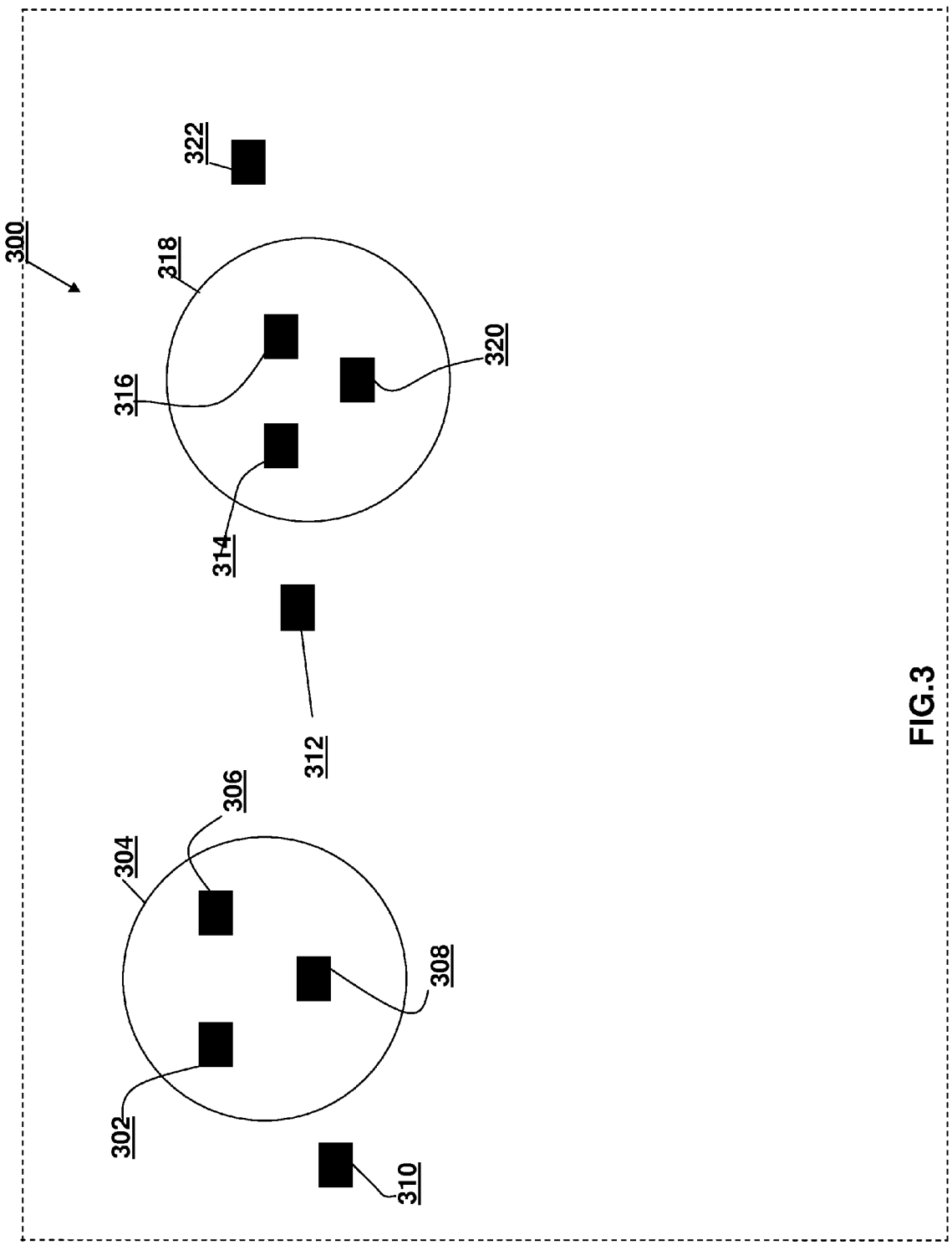
FIG. 3 is an example embodiment 300 of the present disclosure illustrating a typical wireless adhoc network comprising communicating devices.

FIG. 2 depicts a system a system 200 which is disposed inside the handheld device, the system 200 can assist with sharing of user required data in a wireless adhoc network, in accordance with an embodiment of the present disclosure. The system comprises a data determining module 210, a data broadcasting module 220, a device detecting module 230 and a device sharing module 240.

The data determining module 210 is configured to determine a user required data on a handheld device based on a plurality of information. The user required data can be, but not limited to information related to the network infrastructure, that is information may be pertaining to the access points which may contain better quality of service. The user required data can also be a webpage content which cannot be retrieved due to various constraints such as, poor quality of service from the access points, disability to connect to an access point. The user required data can also be information related to geographical location and information related to a plurality of services such as, information regarding ATM, Petrol bunks, service stations etc. The plurality of data present on the handheld device can be historical data present on the web-browser of the handheld device. When a user requests for webpage or any data, each of the requests are stored in the historical data or the cached data section of the handheld device.

The data broadcasting data 220 is configured to receive the user required data from the data determining module 210 and broadcast the user required data within the wireless adhoc network. Broadcasting of the user required data includes, using communication channels such as bluetooth, infrared, web-enabled services to broadcast the data within the wireless adhoc network.

The system 200 further comprises a device detecting module 230 configured to receive user required data from the data determining module 220 and to detect the plurality of devices comprising the user required data within a proximity environment. The device detecting module, disposed 230, automatically starts detecting for the plurality of devices through a communication channel which may include, bluetooth, infrared, or any similar wireless communication. The handheld device determines the user required data on the plurality of devices by accessing the browser history contents, or the location at which the cached data is stored in the plurality of devices. In another embodiment of the present disclosure, the handheld device can also communicate with an access point to directly obtain the data, if the user is happy with the quality of service provided by the access point.

Furthermore, the system comprises a data sharing module 240 configured to assist in sharing of the user required data automatically between the plurality of devices and the handheld device. The user required data is shared automatically between the plurality of devices and the handheld device. Once the handheld device identifies the plurality of devices, which can be one or more, a transparent communication is automatically established between the handheld device and the plurality of devices. In another embodiment of the present disclosure, the transparent connection can be established between the handheld device and a plurality of devices without any user intervention. After a transparent communication channel has been established, the user required data is automatically shared between handheld device and the plurality of devices. Furthermore, as soon as the user required data has been received on the handheld device, a completeness check is carried out to identify if the complete data has been shared. If the complete user required data has been shared, then it is displayed on to the output screen of the output device for the user to view or to read. If the data gathered is not complete, the handheld device again detects for the plurality of devices consisting of the user required data. The steps are repeated until the user required data is gathered completely on to the hand held device. After the user required data has been gathered on to the hand held device, the user required data is logically arranged to display it in a readable format to the user.

In another embodiment of the present disclosure, the system 200 comprises an output module configured to receive the complete user required data from the data sharing module 240 and display the complete user required data on an output display of the handheld device.

As will be appreciated by person having ordinary skill in the art, one of the embodiments of the present disclosure can be explained by considering the example embodiment 300 of the present disclosure illustrating a typical wireless adhoc network comprising communicating devices. The example embodiment 300 comprises a first adhoc network 304 and a second adhoc network 318. The embodiment 300 also comprises handheld devices 310, 312 and 322. Furthermore, the embodiment 300 also comprises a mobile phones as plurality of devices 302, 306, 314, 316 and 320. The user using a handheld device 310 may send a request to access a webpage within the wireless adhoc network 304. Due to poor quality of service provided by the wireless device within the wireless adhoc network 304, the user is unable to access the required webpage. The data determining module 210 on the handheld device 310 determines the user required by accessing the history contents of the browser. After determining the user required data, in this case a particular webpage, the data broadcasting module 220 broadcasts the user required data within the wireless adhoc network 304. The broadcasting is done through a communication channel. The device detecting module 230 detects for a plurality of devices for the user required data. In the example embodiment 300, the device detecting module 230 detects a mobile phone 306 containing the user required data. The device sharing module 240 establishes a connection between the mobile phone 306 to share the user required data. After completely gathering the user required data on the handheld device 310, the user required data is displayed to the user on an output screen of the handheld device. If the user required data is also present in the mobile phones 302 and 308, the handheld device 310 can also obtain the data simultaneously from the mobile phones 302 and 308.

In another embodiment of the present disclosure, the handheld device 310 can also detect and share the user required data from the wireless adhoc network 318. As illustrated in the example embodiment 300, the handheld device 310 is not within the proximity environment of the wireless adhoc network 318. In this embodiment, the user required data can be automatically transferred to the handheld device 312. When the handheld device 310 is within the proximity environment to the handheld device 312, the user required data can be automatically shared between the handheld device 310 and 312.

In view of the many possible embodiments to which the principles of our invention may be applied, we claim as our invention all such embodiments as may come within the scope and spirit of the following claims and equivalents thereto.

What is claimed is:

1. A method for facilitating sharing of data, the method comprising:
   determining, on a first handheld device, a webpage content that could not be retrieved on the first handheld device due to low quality of service from an access point, the first handheld device is in proximity environment of a first wireless adhoc network;
   broadcasting, by the first handheld device, the webpage content within a second wireless adhoc network different from the first wireless adhoc network;
   detecting, at the first handheld device, one or more devices in the proximity environment of the second wireless adhoc network, the webpage content that could not be retrieved on the first handheld device, wherein web browser history contents of the one or more devices are accessed to ascertain presence of the webpage content on the one or more devices;
   sharing the web page content automatically between the one or more detected devices in the second wireless adhoc network and a second handheld device in proximity with the second wireless adhoc network;
   sharing the web page content automatically between the second handheld device and the first handheld device when the second handheld device is in proximity of the first handheld device.

2. The method of claim 1 wherein determining the web page content on the first handheld device further comprises, determining the web page content based on a plurality of information present on the first handheld device.

3. The method of claim 1 wherein the sharing between the second handheld device and the first handheld device occurs over a communication channel comprising a wireless connection.

4. The method of claim 1 further comprising analyzing the web page content received from the one or more detected devices to check for completeness of the web page content.

5. The method of claim 4 further comprises arranging the web page content into a readable format.

6. The method of claim 1, wherein the one or more devices are one or more of:
   a mobile phone; and
   a laptop.

7. The method of claim 1 wherein the first handheld device and the second handheld device is a mobile phone.

8. The method of claim 4 further comprising, searching for the one or more devices and receiving the web page content until the webpage content is gathered completely.

9. The method of claim 2, wherein the plurality of information present on the first handheld device is historical data present on a web-browser of the first handheld device.

10. The method of claim 1, wherein the proximity environment is within the first wireless adhoc network.

11. A computer system for facilitating sharing of data, the computer system comprising a memory and a processor, the computer system further comprising:
    a data determining module configured to facilitate, using the processor, a first handheld device to determine a webpage content that could not be retrieved on the first handheld device due to low quality of service from an access point, the first handheld device is in proximity environment of a first wireless adhoc network, further wherein the first handheld device is a mobile phone;

a data broadcasting module configured to facilitate, using the processor, the first handheld device to broadcast the webpage content within a second wireless adhoc network different from the first wireless adhoc network;

a device detecting module configured to facilitate, using the processor, the first handheld device to detect one or more devices in the proximity environment of the second wireless adhoc network, comprising the webpage content that could not be retrieved on the first handheld device, wherein web browser history contents of the one or more devices are accessed to ascertain presence of the webpage content; and a data sharing module configured to assist, using the processor, in sharing of the webpage content automatically between the first handheld device and a second handheld device in proximity with the second wireless adhoc network when the first handheld device is in proximity of the second handheld device, wherein prior to sharing of the webpage content between the first handheld device and the second handheld device, the one or more devices in the proximity environment of the second wireless adhoc network share the web page content with the second handheld device in proximity with the second wireless adhoc network.

12. The system of claim 11, wherein the data determining module is configured to determine the webpage content based on the plurality of information present on the first handheld device.

13. The system of claim 11, further comprising a data communication module configured to establish, using the processor, a communication channel between the first handheld device and the second handheld device.

14. The method of claim 13, wherein the communication channel is a wireless connection.

15. The system of claim 11, wherein the data sharing module is further configured to analyze the web page content received from the one or more detected devices to check for completeness of the web page content.

16. The system of claim 15, wherein the data sharing module is further configured to arrange the web page content into a readable format.

17. The system of claim 11, wherein the one or more devices are one or more of:
a mobile phone; and
a laptop.

18. The system of claim 16, wherein the data sharing module is configured to search for the one or more devices and receive the web page content until the web page content is gathered completely.

19. The system of claim 11, wherein the plurality of information present on the first handheld device is historical and present on a web-browser of the first handheld device.

20. The system of claim 11 further comprising an output module configured to receive, using the processor, a complete web page content from the data sharing module and display the complete web page content on an output display of the handheld device.

* * * * *